United States Patent
Dorrance et al.

(10) Patent No.: US 9,665,793 B2
(45) Date of Patent: May 30, 2017

(54) METHOD FOR DETERMINING PARAMETERS OF A ROTATING OBJECT WITHIN A PROJECTED PATTERN

(71) Applicant: Hunter Engineering Company, St. Louis, MO (US)

(72) Inventors: Daniel R. Dorrance, Ballwin, MO (US); Mark S. Shylanski, University City, MO (US)

(73) Assignee: Hunter Engineering Company, St. Louis, MO (US)

( * ) Notice: Subject to any disclaimer, the term of this patent is extended or adjusted under 35 U.S.C. 154(b) by 303 days.

(21) Appl. No.: 14/209,552

(22) Filed: Mar. 13, 2014

(65) Prior Publication Data

US 2014/0267699 A1 Sep. 18, 2014

Related U.S. Application Data

(60) Provisional application No. 61/787,630, filed on Mar. 15, 2013.

(51) Int. Cl.
*G06T 7/00* (2006.01)
*G06T 7/20* (2006.01)
(Continued)

(52) U.S. Cl.
CPC ............ *G06K 9/60* (2013.01); *G01B 11/2755* (2013.01); *G06T 7/73* (2017.01); *G01B 2210/20* (2013.01);
(Continued)

(58) Field of Classification Search
None
See application file for complete search history.

(56) References Cited

U.S. PATENT DOCUMENTS

| | | | |
|---|---|---|---|
| 4,745,469 A | 5/1988 | Waldecker et al. | |
| 4,899,218 A | 2/1990 | Waldecker et al. | |

(Continued)

FOREIGN PATENT DOCUMENTS

| | | |
|---|---|---|
| EP | 2079982 B1 | 2/2010 |
| WO | 0231437 A1 | 4/2002 |

(Continued)

OTHER PUBLICATIONS

Cootes et al. ("Active Shape Models—Their Training and Application" Computer Vision and Image Understanding Vo. 61, No. 1, 1995).*

*Primary Examiner* — Kate Luo
(74) *Attorney, Agent, or Firm* — Polster, Lieder, Woodruff & Lucchesi, LC

(57) ABSTRACT

A method for contactless measurements of a vehicle wheel assembly by acquiring a sequence of images as the vehicle wheel assembly moves within a projected pattern of light. Images of the vehicle wheel assembly are acquired and processed to identify the portions of the images corresponding to the wheel assembly, such as by recognition of the wheel rim edge. The identified portion of each image is cropped and a resulting point cloud of data rotational aligned by an optimization procedure to remove the effect of wheel translation and rotation between each image, as well as to identify a center of rotation and amount of rotation for each image which yields a best-fit result. Superimposing the resulting point clouds produces a generated image with a high density of data points on the optimally fit surfaces of the wheel assembly, which can be used to further refine the axis of rotation determination.

17 Claims, 6 Drawing Sheets

(51) Int. Cl.
*G06K 9/60* (2006.01)
*G01B 11/275* (2006.01)
*G06T 7/73* (2017.01)

(52) U.S. Cl.
CPC .... *G01B 2210/286* (2013.01); *G06T 2200/04* (2013.01); *G06T 2207/10016* (2013.01); *G06T 2207/10028* (2013.01); *G06T 2207/20221* (2013.01)

(56) References Cited

U.S. PATENT DOCUMENTS

| | | | |
|---|---|---|---|
| 5,724,129 A | 3/1998 | Matteucci | |
| 5,731,870 A | 3/1998 | Bartko et al. | |
| 5,978,077 A | 11/1999 | Koerner et al. | |
| 6,151,562 A | 11/2000 | Merrill | |
| 6,341,013 B1 | 1/2002 | Battiti et al. | |
| 6,404,486 B1 | 6/2002 | Nobis et al. | |
| 6,414,304 B1 | 7/2002 | Boess et al. | |
| 6,559,936 B1 | 5/2003 | Colombo et al. | |
| 6,894,771 B1 | 5/2005 | Dorrance et al. | |
| 7,230,694 B2 | 6/2007 | Forster et al. | |
| 7,336,350 B2 | 2/2008 | Dorrance et al. | |
| 7,454,841 B2 | 11/2008 | Burns, Jr. et al. | |
| 7,535,558 B2 | 5/2009 | Uffenkamp et al. | |
| 7,583,372 B2 | 9/2009 | Shylanski et al. | |
| 7,746,456 B2 | 6/2010 | Braghiroli | |
| 7,774,946 B2 | 8/2010 | Boni et al. | |
| 7,860,295 B2 | 12/2010 | Donner et al. | |
| 7,864,309 B2 | 1/2011 | De Sloovere et al. | |
| 7,877,883 B2 | 2/2011 | Schommer et al. | |
| 7,907,265 B2 | 3/2011 | Tentrup et al. | |
| 8,107,062 B2 | 1/2012 | De Sloovere et al. | |
| 8,150,144 B2 | 4/2012 | Nobis et al. | |
| 8,254,666 B2 | 8/2012 | Uffenkamp et al. | |
| 8,274,648 B2 | 9/2012 | Corghi | |
| 8,363,979 B2 | 1/2013 | Abraham et al. | |
| 8,400,624 B2 | 3/2013 | De Sloovere et al. | |
| 8,418,543 B2 | 4/2013 | Tentrup et al. | |
| 8,522,609 B2 | 9/2013 | Nobis et al. | |
| 2008/0186514 A1 | 8/2008 | Uffenkamp et al. | |
| 2010/0060885 A1 | 3/2010 | Nobis et al. | |
| 2011/0308309 A1 | 12/2011 | Nobis et al. | |
| 2012/0026293 A1 | 2/2012 | Gruetzmann et al. | |
| 2013/0089233 A1 | 4/2013 | Nobis et al. | |
| 2013/0116969 A1 | 5/2013 | Abraham | |
| 2013/0188020 A1 | 7/2013 | Seifert et al. | |
| 2014/0063510 A1 | 3/2014 | Seifert | |

FOREIGN PATENT DOCUMENTS

| | | |
|---|---|---|
| WO | 2006130694 A2 | 12/2006 |
| WO | 2007077063 A1 | 7/2007 |
| WO | 2010130657 A1 | 11/2010 |
| WO | 2012016813 A1 | 2/2012 |

\* cited by examiner

METHOD FOR DETERMINING PARAMETERS OF A ROTATING OBJECT WITHIN A PROJECTED PATTERN

CROSS-REFERENCE TO RELATED APPLICATIONS

The present application is related to, and claims priority from, U.S. Provisional Patent Application Ser. No. 61/787,630 filed on Mar. 15, 2013, and which is herein incorporated by reference.

STATEMENT REGARDING FEDERALLY SPONSORED RESEARCH

Not Applicable.

BACKGROUND OF THE INVENTION

The present application is related generally to machine vision vehicle service systems, and in particular, to a machine vision vehicle service system including an illumination source for projecting a pattern of light onto surfaces within the field of view of an associated imaging sensor, and to a method for computing an axis of rotation of an illuminated rotating body, such as a vehicle wheel, moving through the field of view.

Contactless measurement systems for use in vehicle wheel service procedures, such as wheel alignment measurements and vehicle inspection procedures offer advantages in terms of ease of use, efficiency, and potentially in terms of measurement accuracy over the standards set by the use of conventional wheel-mounted sensors or even machine-vision vehicle service systems employing wheel-mounted optical targets. Both conventional wheel-mounted sensors and wheel-mounted optical targets require an operator to move around a vehicle undergoing a service or inspection procedure to mount and dismount either the sensors or targets. This mounting and dismounting process takes time, and may introduce a source of error into resulting measurements if the sensors or targets are not mounted or compensated properly for the presence of mounting runout.

Contactless measurement systems which utilize imaging sensors to acquire images of the wheels of a vehicle undergoing service, either while the wheels are stationary or while the vehicle is in motion, have the potential to increase the efficiency of a vehicle service or inspection procedure by eliminating some of the prerequisite setup up steps necessary before actual measurements can be acquired using conventional sensors or targets. Similarly, by avoiding the use of wheel clamps or other attachment devices, a potential source of measurement error is eliminated by contactless measurement systems. However, contactless measurement systems are generally not sufficiently advanced so as to always be able to acquire necessary vehicle wheel assembly measurements (i.e. spatial positions and orientations) by simply acquiring an image of an unaltered vehicle wheel in ambient light. This is due in part to the wide variety of vehicle wheel configurations, surfaces, reflectivity, and lighting conditions, etc. which may be encountered when attempting to acquire measurements using a contactless measurement system. Accordingly, some contactless machine vision vehicle service systems utilize an illumination source to project a light, in the form of a pattern such as points or stripes, onto the surface of the vehicle wheel assembly to be observed, such as shown in U.S. Pat. No. 7,454,841 B2 issued to Burns, Jr. et al. on Nov. 25, 2008.

The resulting images can be processed to evaluate the distortion or effect of the vehicle wheel assembly surfaces on the projected pattern, from which wheel assembly spatial position and orientation data, such as an axis of rotation, can be extracted.

Previous approaches to identifying the axis of rotation for a vehicle wheel assembly from a series of images acquired by a machine vision vehicle service system have employed a number of techniques. One method, seeks to fit each acquired image to a surface model of a vehicle wheel assembly, and then compare the surface model parameters associated with each of the fitted images to determine the axis of rotation between the surface models. The difficulty in this method is in the establishment of a surface model to match a relatively unknown object (i.e., vehicle wheel assembly), and the fact that the process is computationally expensive. Other methods attempt to determine an axis of symmetry for a point cloud of observed points in an image, and then track that axis of symmetry through multiple images of the wheel assembly at different rotational positions to determine an axis of rotation. However, the axis of symmetry can be easily biased by non-uniformity in the density of the data points on different parts of the wheel assembly, especially if there is a bias such that one side of the wheel assembly always has more points than the other, due to lighting effects or glare. If this type of bias occurs then the axis of symmetry for the point cloud of observed points will not rotate as the wheel assembly rotates, introducing errors into the determination of the axis of rotation.

Accordingly, it would be advantageous to provide a contactless machine vision vehicle service system with a method for processing acquired images of a wheel assembly illuminated by a projected pattern without necessitating the establishment of a complex surface model for each image, which is not computationally expensive, and which is relatively insensitive to biases introduced by a non-uniformity in acquired points of data form each image.

BRIEF SUMMARY OF THE INVENTION

Briefly stated, the present disclosure sets forth a method for contactless measurements of a vehicle wheel assembly by acquiring a sequence of images as the vehicle wheel assembly rolls through a projected pattern of light. Images of the vehicle wheel assembly are acquired and processed to identify the portions of the images corresponding to the wheel assembly, such as by recognition of the wheel rim edge. The identified portion of each image is cropped and rotational aligned by an optimization procedure to remove the effects of wheel translation and rotation between each sequential image, as well as to identify a center of rotation and an amount of rotation for each image which yields a best-fit result. Superimposing the resulting sequence of images produces a composite image with a high density of data points on the optimally fit surfaces of the vehicle wheel assembly, which can be used to further refine the axis of rotation determination for use in subsequent alignment angle measurements.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
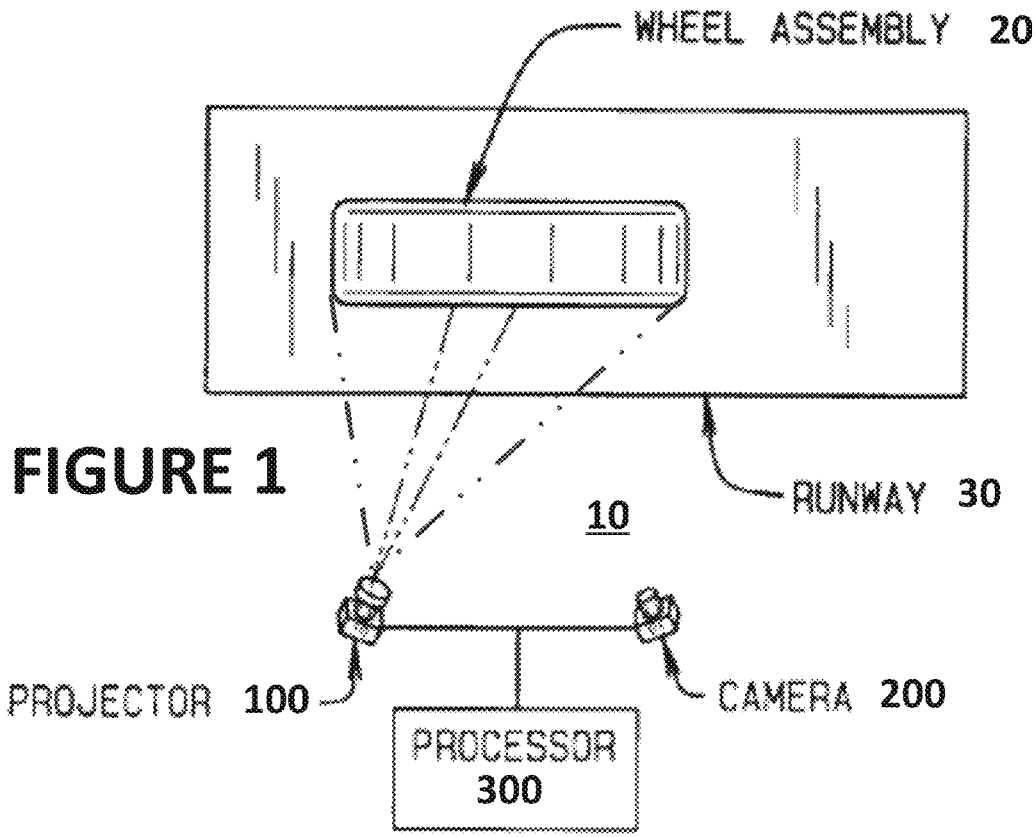
FIG. 1 is a top plan view of a light projection and camera system for acquiring images of an illuminated vehicle wheel assembly in a field of view.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
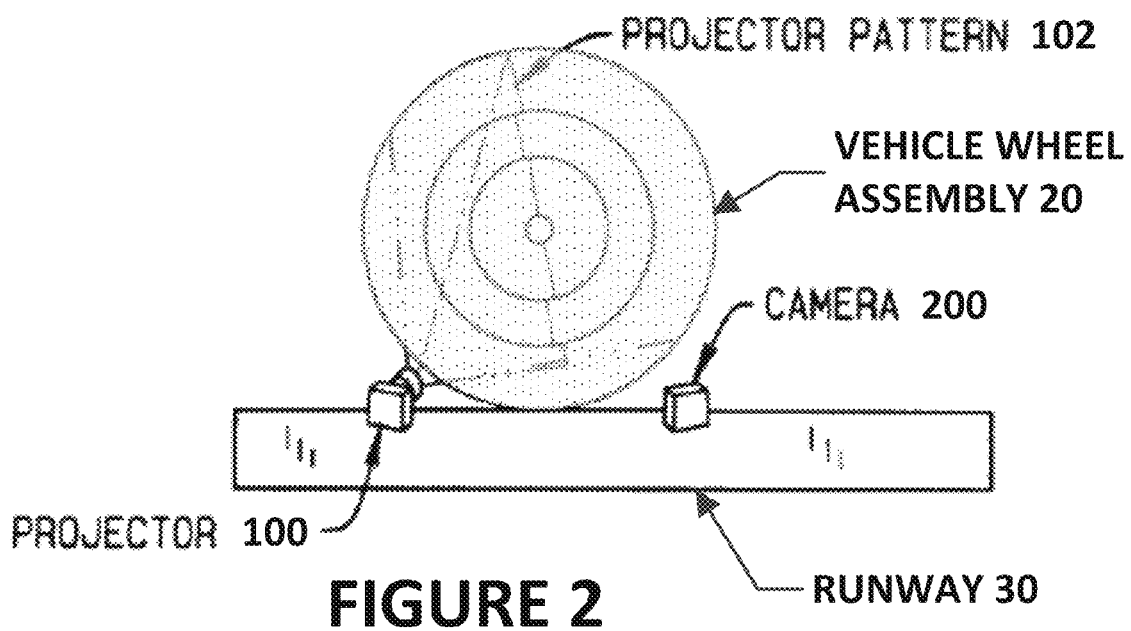
FIG. 2 is a side view of the system of FIG. 1.

Turning to the figures, and to FIGS. 1 and 2 in particular, the methods of the present invention may be utilized with a variety of machine vision vehicle service or inspection systems 10 which include the requisite basic components of a projection system 100 for projecting an illumination pattern 102 onto surfaces in a field of view, a camera or imaging system 200 having a field of view for acquiring images of the projected illumination pattern, and a processing system 300. The illumination pattern 102 is preferably a fixed or invariant pattern of discrete points of illumination, which may be a regular arrangement, a pseudo-random arrangement, or a random arrangement. The imaging system 200 may be a single imaging sensor, or may consist of stereoscopic imaging sensors. The fields of view are of sufficient size and orientation to include the surfaces of at least one vehicle wheel assembly 20 when a vehicle undergoing service or inspection is disposed on a vehicle support surface 30, such as a runway or service bay floor. The processing system 300 is operatively coupled to the projection and imaging systems, and is configured with suitable hardware and software instructions to control the projection and imaging systems, as well as to process images received from the imaging system.

As a vehicle wheel assembly rolls (i.e., translates and rotates) through the stationary projected pattern of light 102 from the projection system 100, illuminated points on the surfaces of the vehicle wheel assembly 20 appear to "scan" or move linearly across the surfaces of the vehicle wheel assembly in a direction opposite to the direction of the vehicle wheel assembly translational movement. By acquiring a sequence of images 202 from the imaging system 200 as the vehicle wheel assembly 20 moves through the field of view containing the stationary projected pattern 102, and optimizing individual images to both translate and rotate the resulting point clouds of illuminated points through image processing algorithms implemented in the processing system 300, a best fit representation of the surfaces of the vehicle wheel assembly 20 can be obtained for each acquired image. The optimizations carried out by the processing system 300 can be further constrained to determine a common axis of rotation (AOR) for each best fit representation which yields an overall best fit optimization for the illuminated points on the surfaces of the vehicle wheel assembly 20. A flow chart representation of these steps for one embodiment of the present disclosure can be seen at FIG. 7.

Figure 3A:
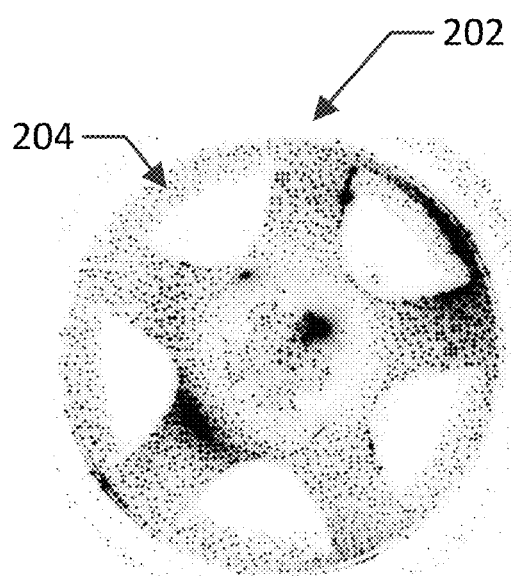
FIG. 3a is a color-inverted image of a vehicle wheel assembly at a first position in a stationary pattern of projected points.
Figure 3B:
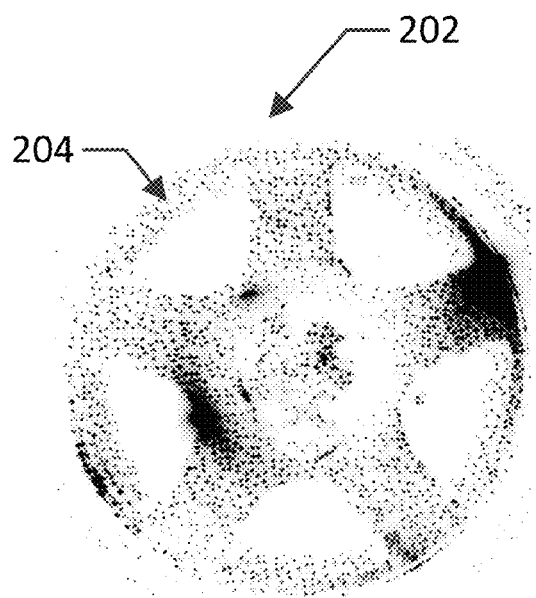
FIG. 3b is a color-inverted image of the vehicle wheel assembly of FIG. 3a at a second position while rolling counter-clockwise through the stationary pattern of projected points.
Figure 3C:
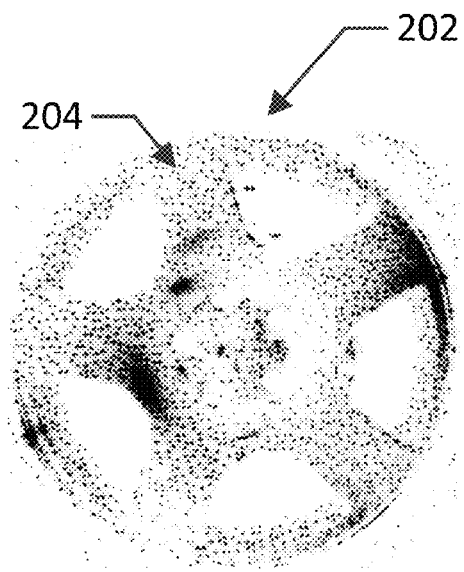
FIG. 3c is a color-inverted image of the vehicle wheel assembly of FIG. 3a at a third position while rolling counter-clockwise through the stationary pattern of projected points.
Figure 3D:
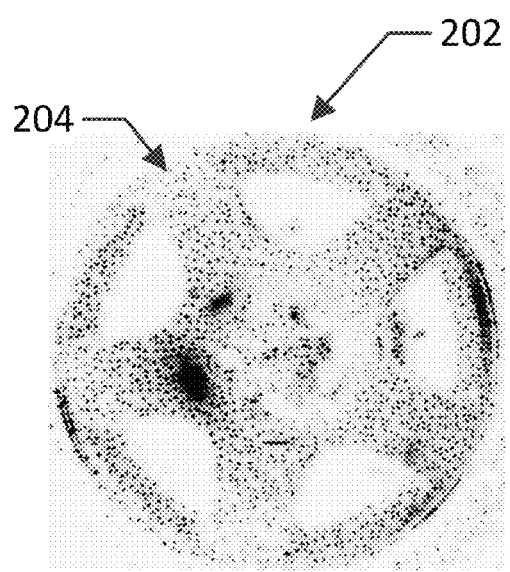
FIG. 3d is a color-inverted image of the vehicle wheel assembly of FIG. 3a at a fourth position while rolling counter-clockwise through the stationary pattern of projected points.
Figure 4:
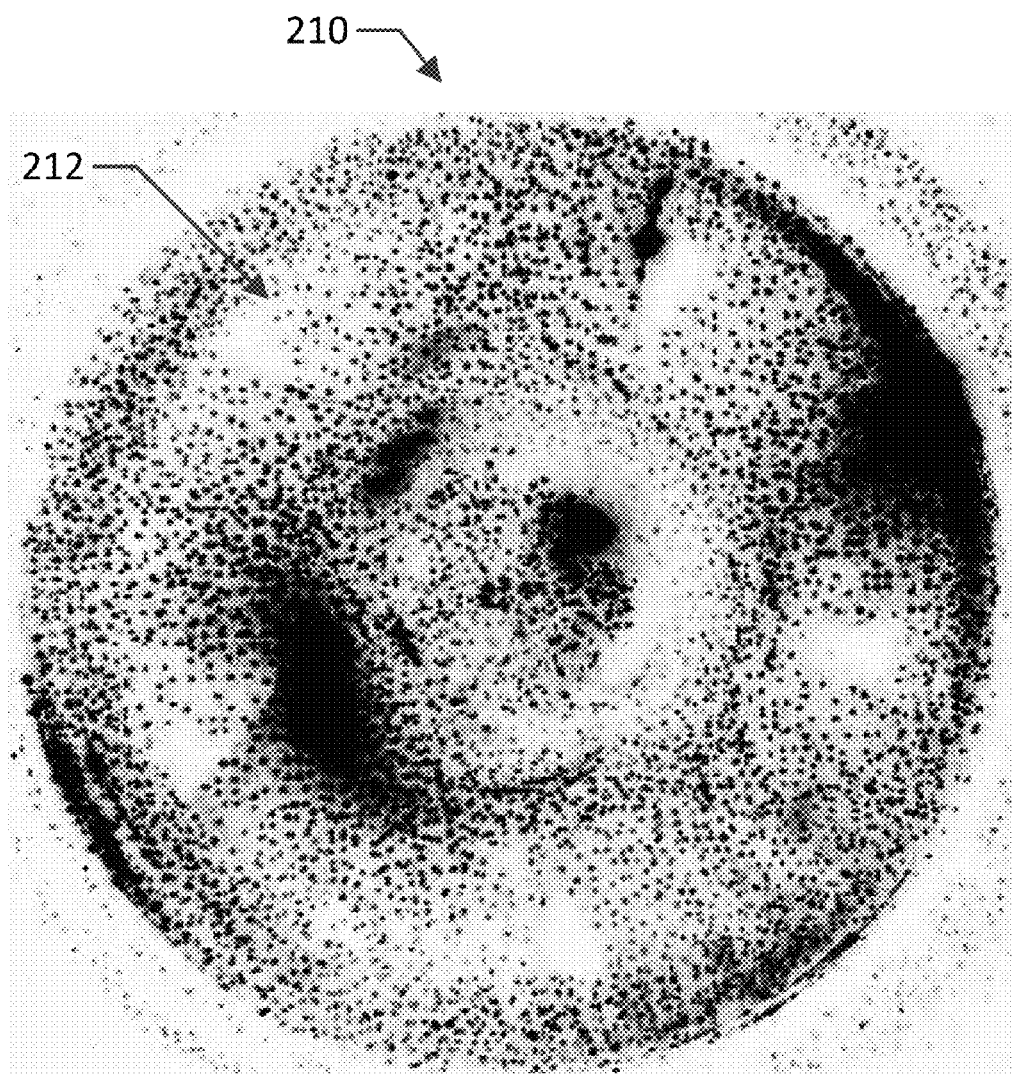
FIG. 4 is a generated composite image of the vehicle wheel assembly resulting from superimposing the images of FIGS. 3a-3d.

With reference to FIGS. 3-7, this process can be demonstrated in two dimensions. Initially, a sequence of at least two, and preferably four or more images 202 of a rolling vehicle wheel assembly 20 passing through a stationary projected pattern of light and imaging system field of view are acquired by the imaging system 200, as at Box 300 in FIG. 7. The images are each initially processed by the processing system 300 to identify the portions or regions within each image which containing the illuminated vehicle wheel assembly surfaces, such as by recognition of the circular wheel rim edge in each image. The individual images are then cropped, masked, or constrained to leave only point clouds 204 of data points which match substantially the identified portions or regions, such as shown in FIGS. 3A, 3B, 3C, and 3D, and described at Box 302 in FIG. 7. If the point clouds 204 of data from these images are combined without further processing, a resulting composite image 210 will appear as shown in FIG. 4, consisting essentially of an undefined cloud 212 of data points from which little useful information regarding the vehicle wheel assembly 20 can be determined.

Figure 5A:
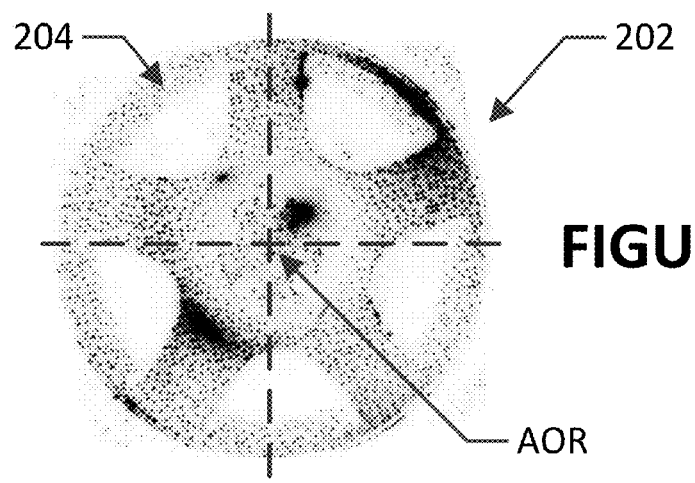
FIG. 5a is the image of FIG. 3a, rotated such that the vehicle wheel assembly is rotationally aligned with the rotational position of the vehicle wheel assembly shown in the image of FIG. 3b.
Figure 5B:
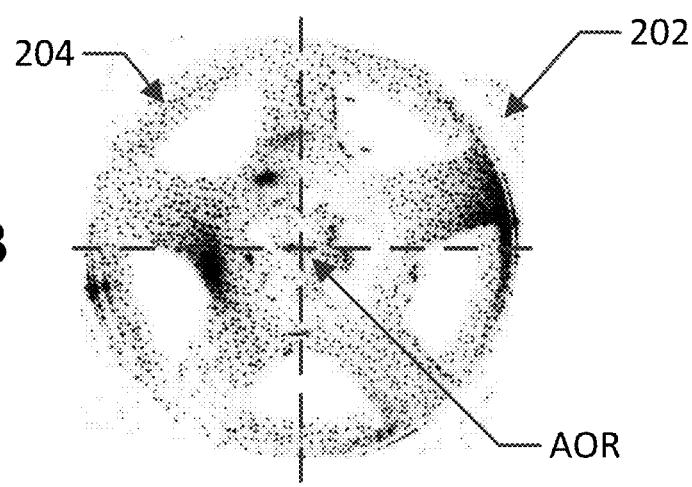
FIG. 5b is the image of FIG. 3c, rotated such that the vehicle wheel assembly is rotationally aligned with the rotational position of the vehicle wheel assembly shown in the image of FIG. 3b.
Figure 5C:
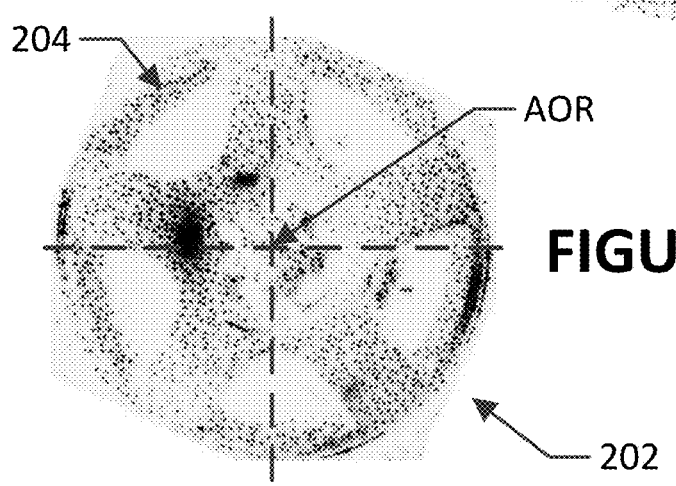
FIG. 5c is the image of FIG. 3d, rotated such that the vehicle wheel assembly is rotationally aligned with the rotational position of the vehicle wheel assembly shown in the image of FIG. 3b.
Figure 6:
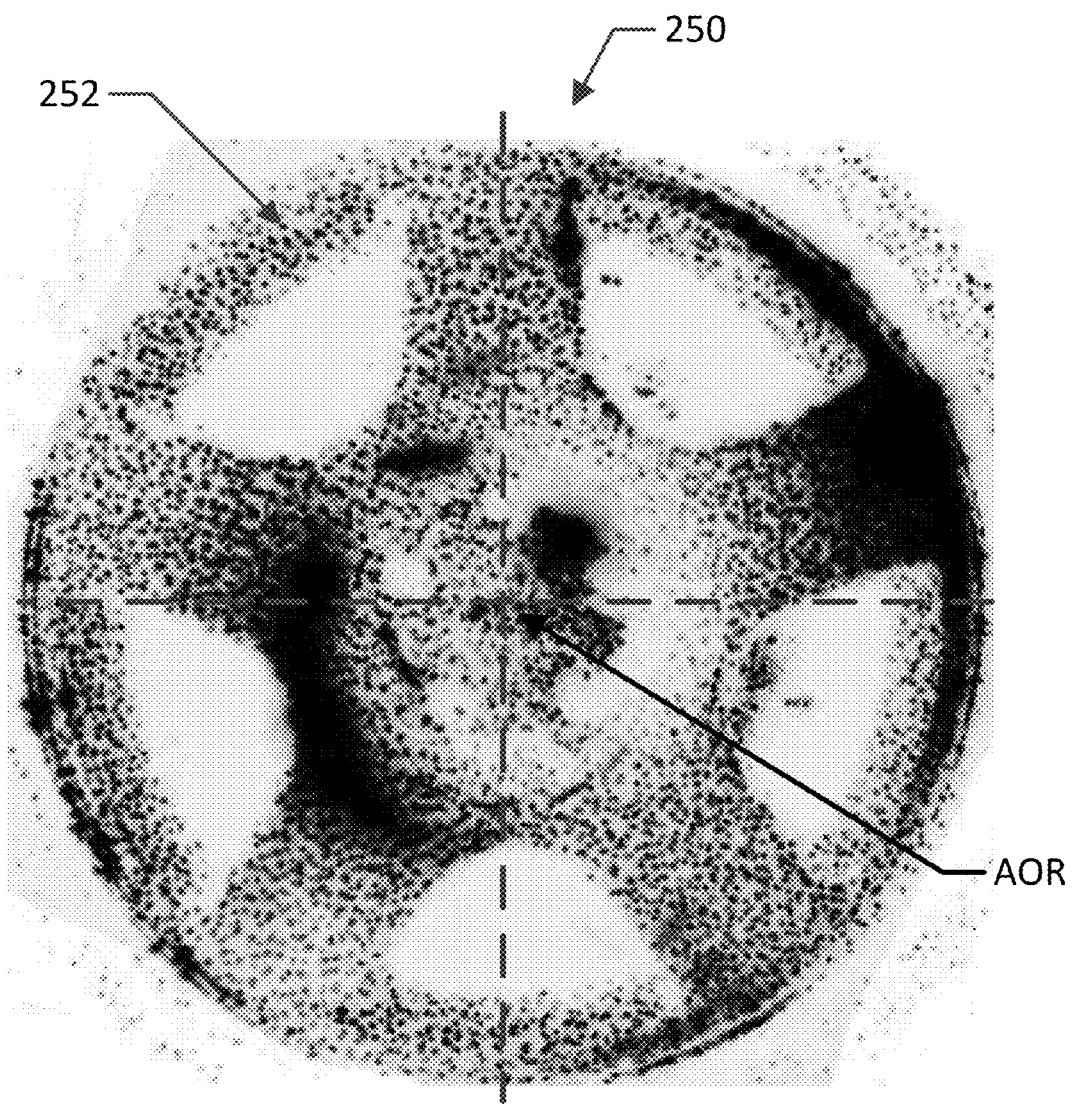
FIG. 6 is a generated composite image of the vehicle wheel assembly resulting from superimposing the images of FIGS. 3b, 5a, 5b, and 5c.

Instead, using the method of the present disclosure, pairs of point clouds 204 of data from each of the images 202 are further manipulated by the processing system 300 using rotational transforms to bring the individual point clouds 204 of data which represent the illuminated surfaces of the vehicle wheel assembly into rotational alignment. For each point cloud 204 of data, this process establishes a center of rotation about which the rotation occurs, as well as a measure of the associated amount of rotation, as seen at Box 304 in FIG. 7. For example, as shown in FIGS. 5A, 5B, and 5C, the point clouds 204 of data from the images 202 of FIGS. 3A, 3C, and 3D are rotationally aligned with the point cloud 204 of data for image 202 shown in FIG. 3B (which remains un-rotated). The point clouds 204 of data from the cropped and rotated images 202 are next superimposed and collapsed into a single composite image 250, such as shown in FIG. 6, in which the illuminated surfaces of the vehicle wheel assembly from each discrete image 202 are rotationally aligned, producing a high density point cloud 252 of illuminated data points of the surfaces of the observed vehicle wheel assembly 20.

Those of ordinary skill in the art will recognize that a procedure similar to that described above for the two-dimensional data can be implemented using three-dimensional data by following substantially the same steps. Initially, the approximate location of the vehicle wheel assembly rim edge is identified by the processing system 300 in each acquired image 202 based on the circular nature of the rim edge, and a point cloud 204 of data points is selected. Once the vehicle wheel assembly rim edge is identified in each acquired image, an estimate of an initial 3D translation between each of the acquired images can be established. An initial estimate of the amount of rotation by the vehicle wheel assembly between each acquired image can be made by the processing system 300 using the approximate diameter of the wheel and tire (if it can be identified in the acquired images) and the knowledge that the vehicle wheel assembly 20 is rolling through the field of view. Next, the estimates are utilized by the processing system 300 as a starting point for an optimization to fit the point clouds 204 of data from each acquired image into a composite image of the smooth surfaces corresponding to the surfaces of the vehicle wheel assembly 20, from which an axis of rotation can be established. The spatial density of the point cloud data points in the composite image will increase where there are surfaces within the composite image, and when the fit is optimal. Clusters of neighboring point cloud data points that are on the wheel assembly surfaces will respond to the optimization. Those point cloud data points which are not on the wheel assembly surfaces (such as those which are on a brake rotor or wheel fender) will not respond to the optimization process in the same manner as those on the rotating surfaces, because they will have a large or constant error during the optimization process and will be filtered out of the optimization. Those of ordinary skill in the art will further recognize that the optimization procedure of the present disclosure may be used in combination with other image processing techniques, such as a morphing techniques, to further refine the estimated axis of rotation for the vehicle wheel assembly surfaces in the composite image.

There are a number of techniques known in the art for determining point clouds 204 of data which are representative of the surfaces of objects such as vehicle wheel assemblies 20. An exemplary machine vision system 100 suitable for acquiring the necessary point clouds 204 of data is sold by Prime Sense Ltd, and includes a projection system 100 to project a pattern of illuminated points and an imaging system 200 to acquire associated images. Other systems employing stereo cameras and structured light sources that produces a multitude of illuminated or identifiable points in an acquired image could also be used to acquire a sufficient number of data points to establish a point cloud 204. The accuracy required for the point clouds 204 depends on the number of two- or three-dimensional data points to be acquired, and the number of images of the vehicle wheel assembly as it is rolled or rotated within the field of view. The higher the number of data points and the number of acquired images, the less accurate the two- or three-dimensional points are required to be. Each data point in the point cloud is represented by X, Y, (and Z) components in the imaging sensor coordinate system.

Once point clouds 204 of data points are acquired for a number of sequential images of the rolling (or rotating) vehicle wheel assembly 20, a number of suitable methods can be used to obtain an initial estimate of the vehicle wheel assembly axis of rotation (AOR), the amount the vehicle wheel assembly has translated between each acquired image (if rolling), and the amount the vehicle wheel assembly has rotated between each acquired image. Vehicle wheel assemblies generally have circular symmetry, so the axis of rotation (AOR) of the vehicle wheel assembly can be estimated by finding the axis of symmetry of the corresponding point cloud 204 of data points. The amount of translational movement for the vehicle wheel assembly 20 between sequential images can be determined by computing the axis of symmetry of each respective point cloud 204, and calculating the amount of translation of the corresponding axis of symmetry. The amount of translation may also be determined by identifying the rim-tire interface in each of the point clouds 204 and calculating a distance the rim-tire interface translates between sequentially acquired images. Similarly, dense regions of data points present in the point clouds on the vehicle wheel assembly spoke surfaces may also be used to establish a region of interest (ROI) in each acquired image that can guide the registration process between acquired images in directions which are both radial and tangential to the vehicle wheel assembly axis of symmetry. The approximation of the transform between one acquired image 202 and another acquired image 202 could, in-part, be driven by a comparison of how well an ROI from one acquired image 202 superimposes over an ROI from another acquired image 202. The amount of rotation between acquired images 202 can be estimated based on the determined amount of translation between the acquired images 202 and the height of the axis of symmetry above the supporting surface 30 on which the vehicle wheel assembly is disposed (i.e. the radius of the vehicle wheel assembly). Since the vehicle wheel assembly 20 is rolling on the runway surface 30, it is possible to determine the amount of rotation between acquired images, measured in degrees, by the equation:

$$\text{Rotation} = 360 * \frac{\text{Distance}}{2 * \pi * \text{axle height}} \quad \text{Eqn. (1)}$$

Those of ordinary skill in the art will recognize that the processing system 300 may be configured to implement a variety of optimization routines to refine the fit of the point clouds 204 of data points in order to determine the common axis of rotation of each acquired image 202. For example, the Levenburg-Marquardt optimization method would be a suitable optimization algorithm (Box 314 in FIG. 7). One way the optimization procedures can be configured is such that the processing system 300 determines the translation and rotation between each of the acquired images 202 that yields the best fit of the point cloud 204 data points to one another, and with the further constraint that a common axis of rotation (AOR) is determined. The translation and rotation between a pair of acquired images is represented by a six degree of freedom (6DOF) 3D transform. In a 6DOF, the degrees of freedom are represented by [$T_x$, $T_y$, $T_z$, $R_x$, $R_y$, $R_z$]where the T components are the translations along the x, y, and z axis and the R components are rotations about the x, y, and z axis. When the optimization is complete, (Box 322) the axis of rotation (AOR) can be determined directly from the $R_x$, $R_y$, and $R_z$ components by the use of conventional methods, such as by a simply average of the axis or rotation vectors found for all of the acquired images 202 (as at Box 324 in FIG. 7).

Figure 7:
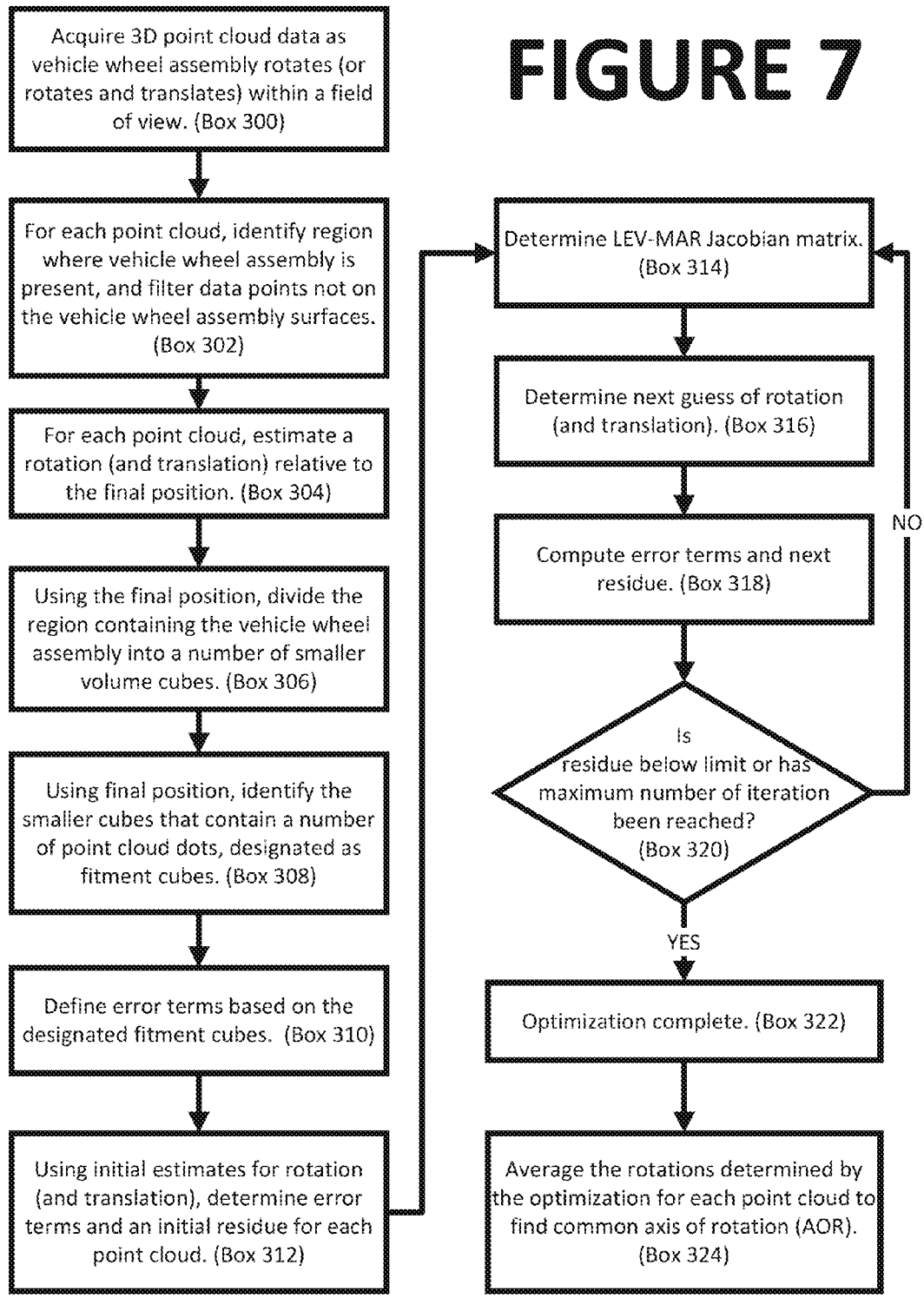
FIG. 7 is a flow chart of an exemplary procedure of the present disclosure.

The way most optimization procedures work is that an initial guess is made for a solution, and error terms are determined based on the initial guess (Box 312 in FIG. 7). New error terms are then compared with any previous error terms, and a new guess is formulated (Box 316 in FIG. 7) to minimize the error terms (Box 318 in FIG. 7). The optimization cycle continues until the solution can no longer be found which successfully minimizes the error terms, or until the overall error terms are sufficiently small enough to justify stopping the optimization (i.e. have reached a threshold) (Box 320 in FIG. 7). Formulation of the error terms is critical to allowing the optimization procedures to converge correctly to the desired solution.

The method of the present disclosure merges point clouds 204 of data points together in a generic fashion. In contrast, other methods attempt to fit surface models to the point clouds 204 of data points and then determine an axis of rotation (AOR) by comparing the surface models associated with acquired images, or try to determine features specific to the vehicle wheel assembly, such as spokes, and track positional changed to those features across multiple acquired images.

There are a number of methods to formulate error terms for the optimization procedures that represent generic methods of fitting point clouds 204 from two or more acquired images 202. The formulation of error terms discussed here can be used independently or in combination to allow the optimization procedures to converge, however the number of data points and the number of acquired images will dictate which of these formulations will be optimal. The data points associated with a point cloud 204 are locations on the surface of the object being viewed. In the present embodiment, the data points of the point clouds 204 are illuminated points on surfaces of the vehicle wheel assembly. However, the surface data points associated with one acquired image 202 of the vehicle wheel assembly are not the same surface data points as seen in the other acquired images 202 of the vehicle wheel assembly. In the case present method, the individual data points are formed by the stationary light projection, and do not track with the rolling or rotating motion of the vehicle wheel assembly, so improving the fit between acquired images cannot be accomplished by simply minimizing the distance between the same points in multiple views of the vehicle wheel assembly.

There are two primary criteria used to formulate the error terms during the optimization procedure. One criterion is maximizing the density of groups of data points in the point clouds 204. When the fit improves (such as by aligning the acquired images 202 of the vehicle wheel assembly as in FIGS. 5A-5C) the data points from the multiple acquired images start to fall on top of each other, the data points in the point cloud 252 that are on a common surface are more densely packed, and edges of the surfaces become sharper and better defined, as seen in FIG. 6. The second criterion is maximizing the fit of groups of data points to a surface. As the optimization algorithm proceeds and the overall fit improves, groups of data points close to each other in the composite image 250 are on the same surfaces of the vehicle wheel assembly. Maximizing the fit of these data points to a curved surface will lead the optimization to a best possible fit between the acquired images.

Identifying groups of data points either for determining density or fit to a surface is difficult and computationally expensive in three-dimensions. The problem can be simplified where a vehicle wheel assembly 20 is being rolled on a surface 30 in an approximate linear path. A vertical plane can be defined that is approximately parallel to the rolling path of the vehicle wheel assembly 20. The three-dimensional point clouds 204 from each acquired image 202 can be projected to this plane, yielding two-dimensional point sets similar in nature to those shown in FIGS. 3A-3D, discussed previously.

When the optimization algorithm forms an estimation of the transforms between acquired images, the individual acquired images can all be transformed into a combined view point cloud 252, which can then be projected to the vertical plane. This yields a point cloud similar to the image shown in FIG. 6. Areas of high point density can be easily found in this two-dimensional composite image by a number of different techniques known in the art, such as by finding areas of minimum nearest neighbor distances.

In cases where there are a large number of data points and multiple acquired images 202, error terms derived solely from the two-dimensional combined view 250 may be sufficient to determine an acceptable axis of rotation (AOR) solution for the vehicle wheel assembly 20. One of the simplest sets of error terms is the nearest neighbor distance for each data point in the compilation point cloud 252. Other error terms can be derived by demarking the two-dimensional combined view 250 with a uniform grid, and computing the density of data points in each unit of the grid. This grid of densities can then be treated like pixels of an image, and standard routines for determining focus metrics (such as contrast) can be employed to determine error terms for the optimization algorithm.

In cases where error terms from the two-dimensional combined view 250 are not sufficient, then the two-dimensional combined view 250 can be used to identify groups of data points that are part of the same surface of the vehicle wheel assembly 20. Areas of high data point density represent data points that belong to the same surface. These groups of data points can then be used to evaluate a fit to a curved three-dimensional surface as described below.

A combined point cloud 252 of data points from each of the various acquired images 202 can be determined by transforming all the point clouds 204 using the new estimation of the transforms identified by the optimization algorithm. For example, one set of error terms could be determined by computing, for each data point, a distance to the nearest neighbor in three-dimensions. As the fit improves, the nearest neighbor distances will decrease overall. Error terms could also be determined by evaluating the fit of groups of data points that are close to one another. Groups of data points can be identified by the projected plane method previously described, or by dividing the point cloud area into a volume of cubes (Box 306). The density of data points within a cube could be determined, and then volumes of high density data points can be identified as fitment cubes (Box 308). A volume of high density data points represents a surface. Error terms are determined for each of these identified volumes and computed by evaluating the fit of the data points to a curved surface in three-dimensional space (Box 310). Those of ordinary skill will recognize that there are a number of suitable known methods for performing these computations, such as illustrated online in the Point Cloud Library at www.pointclouds.org.

In the context of optimizing a fit in three-dimensional space, a surface element is defined as a small planar surface associated with a group of three-dimensional data points in a point cloud 204, 252. Surface elements can be determined and used in a variety of ways in this optimization process. The concept is similar to using small piece-wise linear segments to represent a curve, planar surface elements can be used to represent a curved surface. One way to determine surface elements is to project the point cloud 204, 252 into a vertical plane as described previously. The two-dimensional plane is then divided into a grid, and those grid areas that contain enough data points then become a planar surface element through a three-dimensional plane fit using the data points from the original three-dimensional point cloud. Surface elements may also be similarly derived by using the same technique with a plane that is perpendicular to the estimated axis of rotation (AOR) for the acquired image.

Error terms can be computed by taking each point cloud, translating and rotating it using the latest transform estimation, and then creating planar surface elements. The planar surface elements are compared between the acquired images, and error terms are generated as translation and angular differences between the planar surface elements. A good fit is achieved when the planar surface elements match well between individual acquired images. It should be noted that the planar surface elements could be determined for each individual acquired image and then the planar surface elements could then be translated, rotated, and compared with each other. This would yield equivalent results.

In addition to finding a best fit for a sequence of acquired images, the optimization procedure implemented with the processing system 300 is utilized to find the common axis or rotation (AOR) between the images. To find the common axis of rotation, additional error terms are considered together with any of the proceeding error terms utilized to achieve the best fit solution. The axis or rotation (AOR) between each acquired image can be determined directly from the rotation components of the 6DOF. The AORs for each of the acquired images can be averaged to determine an average AOR, with the error terms representing a difference between each individual AOR and the averaged AOR which is then minimized Overall, the choice of error terms to be used by the processing system 300 during the optimization procedure may change based on number of available data points, the number of acquired images 202 of the vehicle wheel assembly 20, and the accuracy of the three-dimensional points. All these error terms will allow the optimization procedure to converge when used appropriately, based on the initial conditions. The chosen error terms can be used in combination with one another as well. It should also be noted that solving the sequence of acquired images for the vehicle wheel assembly 20 axis of rotation (AOR) is equivalent to determining the "runout" of the vehicle wheel assembly 20. Once the axis of rotation (AOR) for the vehicle wheel assembly 20 is determined, an inspection or alignment of the vehicle can proceed by methods well known in the art.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for contactless measurements of a vehicle wheel assembly, comprising:
   projecting a pattern of light into a stationary field of view;
   acquiring a sequence of images of said stationary field of view as the vehicle wheel assembly either rotates, or rotates and translates, through said projected pattern of light;
   processing said acquired sequence of images to identify at least a portion of each image associated with surfaces of said vehicle wheel assembly illuminated by said projected pattern;
   establishing for each image portion, a point cloud of non-descript three-dimensional data points corresponding to said illuminated surfaces of the vehicle wheel assembly contained within said image portion;
   optimizing at least two of said point clouds of non-descript three-dimensional data points to compensate for an effect of wheel rotation, and if said wheel is translating, for an effect of wheel translation, between associated images in said sequence, said optimization rotationally aligning said at least two point clouds of non-descript three-dimensional data points to maximize a spatial density of data points in a merged representation of said at least two associated point clouds; and
   identifying an axis of rotation for the vehicle wheel assembly utilizing each of said optimized point clouds.

2. The method of claim 1 wherein said step of identifying the amount of rotation for each of said optimized point clouds includes identifying a three-dimensional transform having six degrees of freedom associated with each of said optimized point clouds.

3. The method of claim 1 wherein said step of processing said acquired sequence of images includes identification of a wheel rim edge in each of said acquired images, said identified wheel rim edge defining said portion of each acquired image associated with said surfaces of the vehicle wheel assembly illuminated by said projected pattern.

4. The method of claim 1 wherein said step of optimizing achieves a best-fit for said at least two associated point clouds by mathematically transforming at least one portion of one of said at least two associated point clouds.

5. The method of claim 1 wherein said step of identifying an amount of rotation for each of said optimized point clouds further includes identifying a direction of rotation.

6. The method of claim 1 wherein said vehicle wheel is rolling through said projected pattern of light.

7. The method of claim 1 wherein said step of identifying said amount of rotation is completed without comparing parameters of surface models representing the vehicle wheel assembly.

8. The method of claim 1 further including the step of identifying a rotation between each of said optimized point clouds; and
 wherein said rotation between each of said optimized point clouds is utilized in said step of identifying said axis of rotation for the vehicle wheel assembly.

9. The method of claim 8 further including the step of identifying a direction of rotation for each of said optimized point clouds; and
 wherein said identified directions of rotation are utilized in said step of identifying said axis of rotation for the vehicle wheel assembly.

10. The method of claim 1 wherein each of said point clouds of three-dimensional nondescript data points is composed of random three-dimensional data points corresponding to said illuminated surfaces of the vehicle wheel assembly.

11. The method of claim 1 wherein each of said point clouds of three-dimensional nondescript data points is composed of pseudo-random three-dimensional data points corresponding to said illuminated surfaces of the vehicle wheel assembly.

12. The method of claim 1 wherein each of said point clouds of three-dimensional nondescript data points is composed of three-dimensional data points corresponding to random illuminated points on said surfaces of the vehicle wheel assembly.

13. The method of claim 1 wherein said step of optimizing filters said point clouds of non-descript three-dimensional data points to remove data points corresponding to illuminated surfaces within said image portion which are not associated with said vehicle wheel assembly.

14. A machine vision vehicle service or inspection system, having an imaging system for acquiring a plurality of images of a vehicle wheel assembly either rotating, or rotating and translating, within a field of view, and a processing system configured with suitable software instructions for receiving and processing said plurality of images, comprising:
 an illumination system configured to project a stationary pattern of illumination into an imaging system field of view through which surfaces of the vehicle wheel assembly are moving;
 wherein said processing system is further configured with software instructions to process said plurality of images to establish associated points clouds of three-dimensional data points from said illuminated surfaces of the vehicle wheel assembly;
 wherein said processing system is further configured with software instructions to utilize an optimization procedure to rotationally align said associated point clouds of three-dimensional data points to identify at least an axis of rotation for the moving vehicle wheel assembly; and
 wherein said optimization procedure rotationally aligns said associated point clouds of three-dimensional data points by determining associated rotational orientations which maximize three-dimensional data point spatial density in an aggregation of said three-dimensional data points from said associated point clouds.

15. The machine vision vehicle service or inspection system of claim 14 wherein said optimization procedure further includes a best-fit optimization to a surface in three-dimensional space.

16. The machine vision vehicle service or inspection system of claim 14 wherein said axis of rotation for the vehicle wheel assembly is identified by the processing system without a comparison of parameters for surface models representing the vehicle wheel assembly.

17. The machine vision vehicle service or inspection system of claim 14 wherein said processing system is configured to establish said associated points clouds of three-dimensional nondescript data points from random illuminated points on said surfaces of the vehicle wheel assembly.

* * * * *